(12) United States Patent
DeLuca et al.

(10) Patent No.: US 6,543,567 B2
(45) Date of Patent: *Apr. 8, 2003

(54) FAULT RESPONSIVE SECURELY STOPPED VEHICLE METHOD AND APPARATUS

(76) Inventors: Michael DeLuca, 734 Camino Gardens La., Boca Raton, FL (US) 33432; Joan DeLuca, 734 Camino Gardens La., Boca Raton, FL (US) 33432

(*) Notice: Subject to any disclaimer, the term of this patent is extended or adjusted under 35 U.S.C. 154(b) by 0 days.

This patent is subject to a terminal disclaimer.

(21) Appl. No.: 09/917,086

(22) Filed: Jul. 27, 2001

(65) Prior Publication Data

US 2002/0020574 A1 Feb. 21, 2002

Related U.S. Application Data

(63) Continuation-in-part of application No. 09/634,279, filed on Aug. 9, 2000.

(51) Int. Cl.[7] .............................................. B60K 28/10
(52) U.S. Cl. ...................................... 180/275; 180/282
(58) Field of Search ................................ 180/275, 276, 180/278, 282, 272, 271; 303/191, 195, 72, 114.1, 115.2; 192/219.1

(56) References Cited

U.S. PATENT DOCUMENTS

| | | | |
|---|---|---|---|
| 3,810,520 A | * 5/1974 | Iwata | 180/282 |
| 3,882,959 A | 5/1975 | Hsieh | |
| 4,076,093 A | * 2/1978 | Mizuno | 180/286 |
| 4,497,395 A | 2/1985 | Nogami et al. | |
| 4,681,196 A | 7/1987 | Fulmer et al. | |
| 4,708,406 A | 11/1987 | Takagi | |
| 4,768,610 A | * 9/1988 | Pagel et al. | |
| 4,925,252 A | 5/1990 | Hee | |
| 4,971,400 A | * 11/1990 | Jonner | |
| 5,135,291 A | 8/1992 | Hee | |
| 5,209,329 A | * 5/1993 | Sigl et al. | |
| 5,415,467 A | * 5/1995 | Utz et al. | |
| 5,484,044 A | 1/1996 | Bursteinas et al. | |
| 5,570,078 A | * 10/1996 | Wayenberg | |
| 5,764,136 A | * 6/1998 | Harron | |
| 5,779,328 A | * 7/1998 | Mergenthaler et al. | |
| 5,791,750 A | * 8/1998 | Spiegelberg | |

(List continued on next page.)

OTHER PUBLICATIONS

US 5,107,858, 12/1992, Chen (withdrawn)*

*Primary Examiner*—Paul N. Dickson
*Assistant Examiner*—David R. Dunn
(74) *Attorney, Agent, or Firm*—IdeoCo.com

(57) ABSTRACT

The braking system of a vehicle is securely engaged in response to the operator of the vehicle causing the vehicle to stop. The braking system remains securely engaged upon detection of a fault such as a vehicle collision, a vehicle malfunction or a problem with the operator or operation of the vehicle, thereby improving vehicle safety. In the event of a collision, securely engaged brakes can significantly reduce resulting vehicle acceleration, potentially avoiding a secondary collision and reducing injuries experienced by the vehicle operator and passengers. In the event that no fault is detected, the braking system is disengaged in response to the operator accelerating the vehicle, either by pressing the gas pedal or releasing the brake pedal, thereby making the securely engaged brakes virtually unperceivable under normal operating circumstances. The rate of release of the braking system is responsive to the gas pedal position. The braking system is released rapidly in response to a substantially depressed gas pedal to facilitate a rapid start or gradually in response to a partially depressed gas pedal to facilitate a smooth start.

20 Claims, 2 Drawing Sheets

U.S. PATENT DOCUMENTS

| | | | |
|---|---|---|---|
| 5,797,467 A | * | 8/1998 | Watanabe |
| 5,967,628 A | * | 10/1999 | Abe et al. |
| 5,979,619 A | * | 11/1999 | Rump |
| 5,984,429 A | * | 11/1999 | Nell et al. |
| 5,988,333 A | | 11/1999 | Catton |
| 6,015,194 A | * | 1/2000 | Decker |
| 6,056,373 A | * | 5/2000 | Zechmann et al. |
| 6,086,515 A | * | 7/2000 | Buschmann et al. |
| 6,105,705 A | * | 8/2000 | Faye ................... 180/275 |
| 6,139,117 A | | 10/2000 | Shirai et al. |
| 6,193,332 B1 | * | 2/2001 | Ono |
| 6,234,586 B1 | * | 5/2001 | Davis et al. |
| 6,256,568 B1 | * | 7/2001 | Siepker et al. |
| 6,256,571 B1 | * | 7/2001 | Fischer et al. |
| 6,267,194 B1 | * | 7/2001 | Bullinger et al. ............ 180/275 |
| 6,286,617 B1 | * | 9/2001 | DeLuca et al. .............. 180/275 |
| 6,364,433 B1 | * | 4/2002 | Stemer ....................... 303/138 |

\* cited by examiner

FAULT RESPONSIVE SECURELY STOPPED VEHICLE METHOD AND APPARATUS

RELATED APPLICATIONS

This is a continuation-in-part of U.S. patent application Ser. No. 09/634,279 filed Aug. 9, 2000.

FIELD OF THE INVENTION

This invention relates in general to the field of vehicles and more particular to the field of vehicle braking systems.

BACKGROUND OF THE INVENTION

A vehicle, such as a street driven automobile, often stops at intersections in response to traffic lights. While waiting for a traffic light signal to indicate a time to accelerate, the vehicle is supposed to remain stopped. A problem arises when, contrary to the intention of a vehicle operator, the vehicle does not remain stopped. One example of a situation where a vehicle may undesirably accelerate from a stopped condition is when an operator's foot accidentally slips off of the vehicle's brake pedal. Another example is when some kind of a fault occurs for example when a vehicle is impacted from the rear, the operator's foot may slip off the brake pedal or may not have enough brake pressure to prevent forward motion of the vehicle. Such situations can result in a collision with another vehicle. For example, the a rear collision could force vehicle into a second collision with a vehicle ahead, or worse force the vehicle into an intersection resulting in a severe broadside collision. Since vehicle collisions are undesirable, it is desirable to provide a vehicle that remains securely stopped when the operator intends the vehicle to be stopped.

When the traffic light generates a green light signal, it is desirable to provide a securely stopping vehicle which accelerates in a way the operator is accustom: fast starts for rapid acceleration and smooth starts for normal acceleration. Furthermore, when operating the vehicle in slow traffic or approaching a stop light it is desirable that a vehicle with secure stopping does not interfere with low speed acceleration and braking of the vehicle.

DETAILED DESCRIPTION OF THE INVENTION

Figure 1:
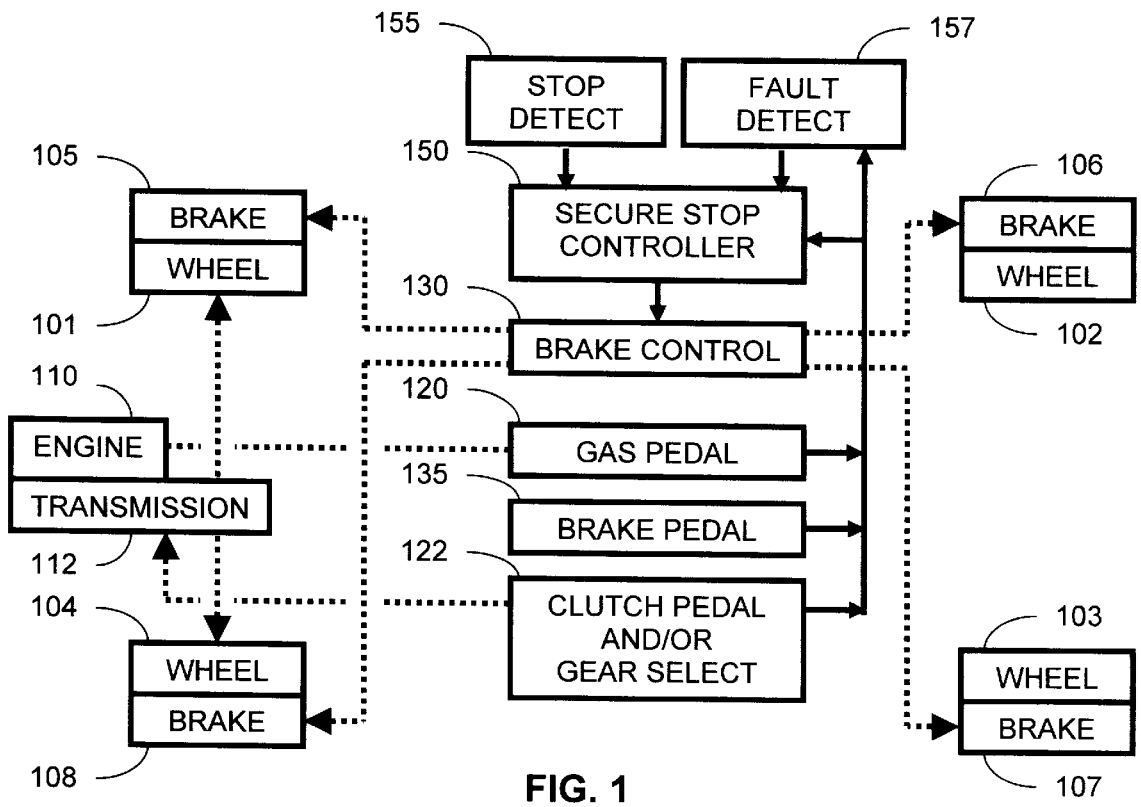
FIG. 1 shows a block diagram of a vehicle operating in accordance with the present invention.

FIG. 1 shows a block diagram of a vehicle operating in accordance with the present invention. The vehicle has four wheels, 101–104, each wheel having a corresponding brake, 105–108. The brakes 105–108 may be either disk or drum or other system for stopping the vehicle. In a front wheel drive embodiment, the front wheels 101–102 are driven by an engine 110 and a transmission 112. The engine is preferably an internal combustion engine as is commonly used in vehicles today. The transmission is either an automatic transmission or a manually shifted transmission having a manually operated clutch for coupling the engine to the wheels. The engine is manually throttled by a throttle or gas pedal 120 and the clutch is manually controlled by a clutch pedal 122. A brake controller 130 is manually operated by a brake pedal 135. The brake controller may include a master cylinder or an anti-lock brake system for controlling the brakes 105–108. The brake controller 130 and brakes 105–108 are part of a braking system which is preferably a hydraulic braking system but other technologies are contemplated including air and electronic braking systems. In operation, when a foot of the operator applies increasing pressure to the gas pedal, the speed of the vehicle increases. When the foot of the operator applies pressure to the brake pedal, the speed of the vehicle decreases. The amount of pressure applied to the brake pedal regulates the rate at which the speed of the vehicle decreases. When the vehicle has stopped, typically very little brake pedal pressure is required to maintain the vehicle in a stopped condition. In a vehicle with an automatic transmission, the typical operator applied brake pedal pressure typically need only be enough to overcome the minimal acceleration of an idling engine which is applied to the wheels. In a vehicle with a manual transmission, the typical operator applied brake pedal pressure typically need only be enough to overcome gravitational accelerations due to the vehicle being situated on a hill.

With such little pressure required to typically maintain a vehicle in a stopped condition, an operator may unintentionally provide too little brake pedal pressure, enabling the vehicle to move, which may result in a collision. Examples of unintentionally providing too little brake pressure include: when the operator is excessively tired or sleepy; when the operator is tending to other matters while the vehicle is stopped, such as caring for children, fetching documents, or operating a radio receiver, cassette tape or compact disk; or when the operator is actively engaged in conversations on a wireless phone or with fellow passengers or while singing a song.

Furthermore, with such little pressure required to typically maintain a vehicle in a stopped condition an operator is unlikely to be providing the significant brake pressure needed to prevent the vehicle from colliding with a third vehicle in the event of being impacted by a second moving vehicle. This is particularly true if the operator's vehicle is impacted from either from the rear or front by the second vehicle. Such collisions are typical when a vehicle is stopped at an intersection.

When acceleration from a stopped condition is desired, because a traffic light turns green for example, the foot of the operator of a vehicle with an automatic transmission is typically removed from the brake pedal and applied to the gas pedal. The operator of a vehicle with a manual transmission typically has one foot on the clutch pedal and one foot on the brake pedal waiting for the traffic light to turn green. A triple movement is required when the light turns green: first, one foot is removed from the brake pedal and then second, the foot is applied to the gas pedal while third, the other foot releases the clutch pedal. This can be a complex operation, particularly when the vehicle is directed up a hill because the vehicle tends to unintentionally roll backwards between the time when the brake pedal is released, the gas pedal is pressed and the clutch pedal is released. Thus, a small time delay results from the time the light turns green to when the operator's foot is applied to the gas pedal.

The invention provides for the problems with a secure stop controller 150, a stop detector 155 and a fault detector 157. The secure stop controller 150 receives signals from the gas pedal 120, clutch pedal 122, brake pedal 135, stop detector 155 and collision detector 157 and applies an additional signal to brake controller 130 to apply or release brakes 105–108. The stop detector 155 is coupled to a velocity detector such as a speedometer. Alternately, the stop detector 155 may be used in conjunction with a slip detector, an anti-lock brake system or other vehicle component that is able to determine if the vehicle is stopped. In the preferred embodiment the stop detector 155 generates a vehicle stopped signal upon or shortly after the vehicle has stopped.

The fault detector 157 determines if the vehicle is being subjected to a faulty condition. A faulty condition includes a vehicle collision which may be detected by devices including an accelerometer measuring sudden acceleration or an acoustic transducer listening for a collision sound. Other methods of collision determination are also anticipated. Faulty conditions can also include other detectable vehicle malfunctions such as failures in engine and transmission controls which may result in undesirable acceleration of the vehicle. Other malfunctions include open doors, engine fires or failures of computer or other control systems. Faulty conditions can also include operator or operation problems rendering an operator unable or insufficiently competent to operate the vehicle. Such conditions include the operator falling asleep or being intoxicated or having an improper gaze, such as looking at the vehicle stereo or navigation system. Sleep, gaze and intoxication detectors are known in the art and may use eye monitoring technology to make a determination. Another example of an operator or operation problem is when an operator intends to back out of a garage but the garage door is closed or the vehicle is in a forward gear. In either situation an object detector, such as object detectors found in collision avoidance systems, could detect the closed garage door at the rear of the car of the garage wall at the front of the car. In response, the fault detector determines the operator has placed the vehicle in gear and that a collision is likely if the vehicle is accelerated. In response, the vehicle remains securely stopped, a alert signal could be further provided to the operator. Other operator problems include the operator having an improper wireless telephone conversation or placing the vehicle in a neutral condition, decoupling the wheels from the engine. Still other operator problems include medical conditions rendering the operator incapacitated such as a coronary, seizure or regurgitation. Other fault conditions include combinations of malfunctions and operator error such as undesired or accidental shifting of a vehicle into a reverse gear.

Figure 2:
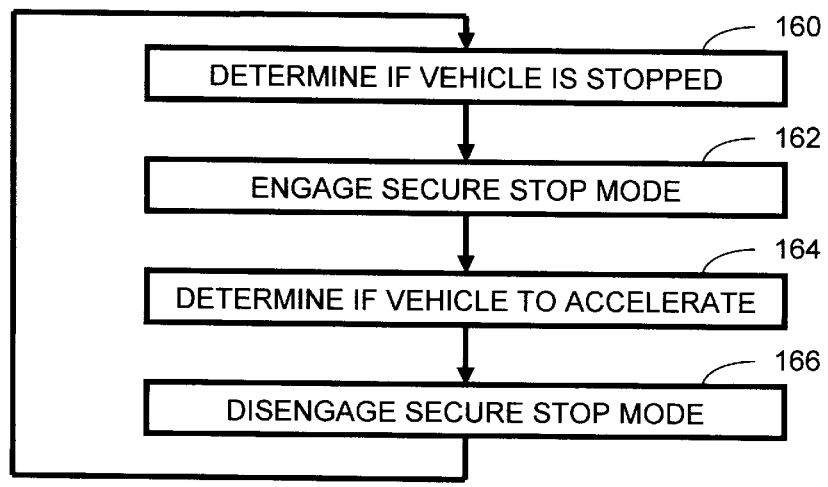
FIG. 2 shows a basic flow diagram for a method of securing a motor vehicle in a stopped condition in accordance with the present invention.

FIG. 2 shows a basic flow diagram for a method of securing a motor vehicle in a stopped condition in accordance with the present invention. Refer also to FIG. 1. When step 160 determines that the vehicle has stopped, stop detector 155 generates a vehicle stopped signal. Most normal driving functions are performed during step 160, until the vehicle is stopped. In response, secure stopping is engaged at step at step 162 where the secure stop controller 150 sends a secure stop signal to the brake controller 130 to engage the brakes 105–108 with a force equivalent to significant brake pedal pressure by the operator. If the brake controller is an anti lock brake system, the brake controller may modulate the brakes to provide improved stopping power in the event of a collision with the second moving vehicle. Since the vehicle is stopped, the operator is not necessarily aware of any significant braking force applied to brakes by the secure stop controller. In an alternate embodiment a dash board light or other signal may be generated to indicate activation of the secure stopped mode to the operator. Then step 164 determines if the operator intends for the vehicle to accelerate. In various embodiments this determination is made in response to the operator applying pressure to the gas pedal, releasing the clutch pedal or releasing the brake pedal, or a combination thereof. In response, step 166 disengages secure stopping. Secure stop controller 150 terminates the secure stop signal and the brake controller 130 disengages the brakes 105–108 allowing the speed of the vehicle to increase.

Figure 3:
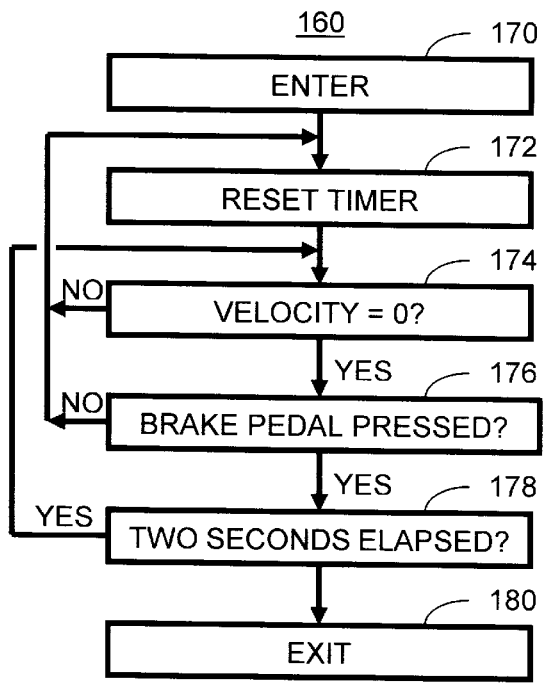
FIG. 3 shows a detailed flow diagram of the step of determining if a vehicle has been stopped.

FIG. 3 shows a detailed flow diagram of the step of determining if a vehicle has been stopped. This corresponds to step 160 of FIG. 2. After entry at step 170, a timer is reset at step 172. The timer continues to be reset if vehicle velocity is not zero at step 174 and the brake pedal is not pressed at step 176. If however, the velocity is zero and while the brake pedal remains pressed for preferably two seconds at step 178, then the vehicle stopped signal is generated and the flow exits at step 180 to proceed to step 162 of FIG. 2. Thus, the vehicle is stopped for a predetermined time of two seconds with the brake applied before the secure stop signal is generated at step 162. Other predetermined times may be used. Alternately, the vehicle stopped signal could be generated when the velocity is zero for a different predetermined time. Or the vehicle stopped signal could be generated after the vehicle has stopped and the suspension settles out from the typical front end dive and consequential rocking motion resulting from the vehicle stopping. This settling could be sensed by a vehicle with active suspension or suspension motion sensors or accelerometers. This embodiment automatically compensations for aging suspension components such as shock absorbers that may increase the suspension settling time with age. These methods are an improvement over generating the vehicle stopped signal simply in response to the speed equaling zero because the secure stopping system is typically not engaged in stop and go traffic where a vehicle crawls along at a low speed with abrupt applications of the brake which may temporarily bring the vehicle to a stop. In such cases it may be desirable to not engage the secure stopping. Nevertheless, engagement of secure stopping in simply in response to the vehicle coming to a stop is an embodiment of the invention.

Figure 4:
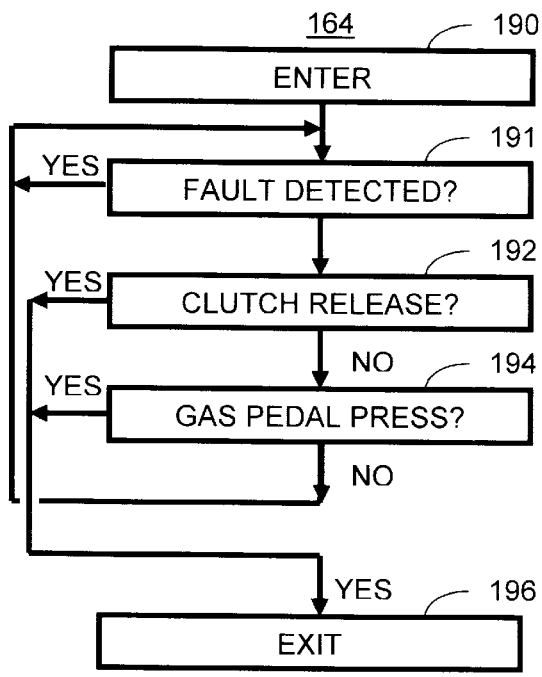
FIG. 4 shows a detailed flow diagram of the step of determining if a vehicle is to accelerate.

FIG. 4 shows a detailed flow diagram of the step of determining if a vehicle is to accelerate. This corresponds to step 164 of FIG. 2. After entry at step 190 step 191 determines if a fault has been detected. The fault could be any kind of fault including the aforementioned faults resulting from a collision from another vehicle, a malfunction of the vehicle and/or a fault resulting from the operator being insufficiently able to operate the vehicle. If a fault is detected, then step 191 causes the brakes to continue to be engaged in the secure stop mode even if other conditions for an acceleration signal are met. In the event of a collision, the secure stop mode can significantly reduce the amount of acceleration of the vehicle thereby not only potentially preventing a secondary collision, but also reducing the impact acceleration experienced by the vehicle operator and passengers, thereby reducing the potential for personal injury. If no fault condition, step 192 checks if the clutch is released. This step is always "NO" for an automatic transmission. Step 194 checks if the gas pedal is pressed. This is an optional step for a manual transmission. This process effectively causes the system to remain in the secure stop mode until the operator either releases the clutch or presses on the gas pedal. Upon detection of either event, the process exits through step 192 to step 166 of FIG. 2 to disengage the secure stop mode. In the preferred embodiment, once the secure stop mode is engaged, the vehicle will remain stopped if the brake pedal pressure is reduced or even if the operator's foot is removed from the brake. This prevents unintentional movement of the vehicle. Furthermore if the vehicle is on a hill, it will not roll backwards. This simplifies the problem of accelerating from a stopped condition with a manual transmission while on a hill because the vehicle does not start to move as soon as the operator's foot is removed from the brake. In an alternate embodiment where the secure stop mode is released only in response to release of the clutch. In this embodiment the operator may even begin to rev the engine before the secure stop mode releases brakes in response to the operator releasing the clutch, thereby assuring that the engine is producing sufficient power to begin climbing the hill as the clutch is released.

In another embodiment, steps 192 and 194 are replaced with a test for release of the brake pedal. In this embodiment, the vehicle is securely stopped so long as the vehicle is stopped and the operator's foot is on the brake. Upon releasing the brake, the vehicle is no longer securely stopped. In this mode under normal conditions the operator may not even notice the vehicle's secure stopping attribute. However, step 191 works to keep the vehicle securely stopped due to a fault detection even if the operator's foot is removed from the brake. For example, if the securely stopped vehicle is involved in a collision, the secure stop mode remains engaged even if the operator releases the brake pedal as a result of the collision. Alternately, if the operator falls asleep while the vehicle is securely stopped, the vehicle will remain securely stopped even if the operator's foot falls off of the brake pedal as a result of the slumber. Any of a number of fault conditions can be used to keep the vehicle securely stopped. In an alternate embodiment, fault detector 157 and fault detection step 191 may be optionally eliminated.

Figure 5:
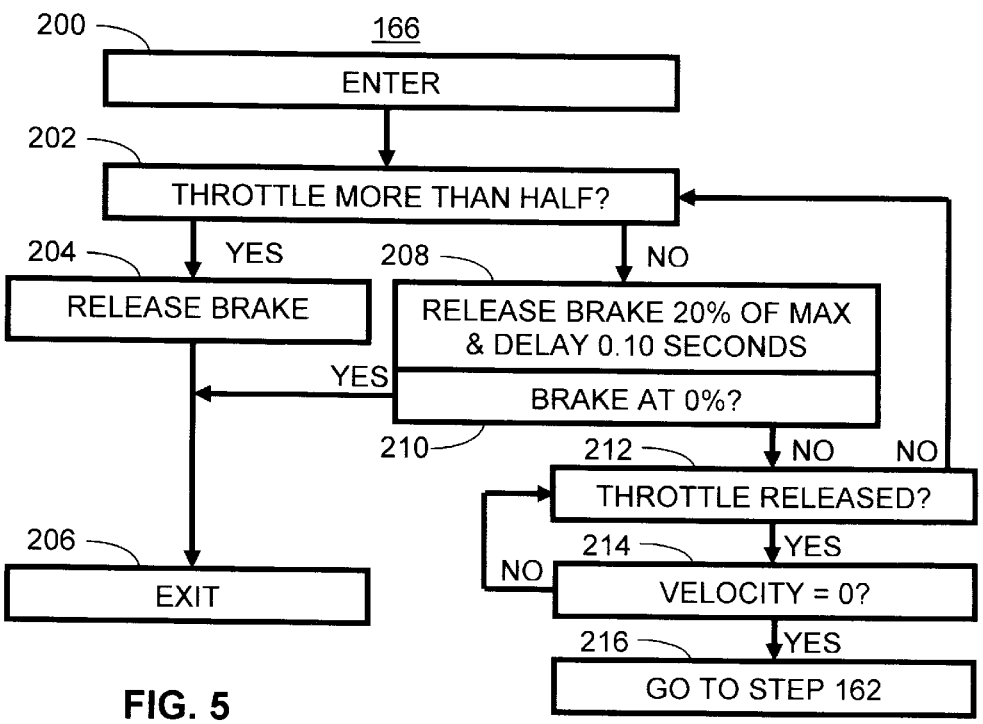
FIG. 5 shows a detailed flow diagram of the step of disengaging the secure stop mode.

FIG. 5 shows a detailed flow diagram of the step of disengaging the secure stop mode. This corresponds to step 166 of FIG. 2. The flow enters at step 200. Step 202 checks if the throttle or gas pedal 120 is more than halfway depressed. This step corresponds to determining the magnitude of a desired acceleration signal. If true then step 204 causes the secure stop signal to terminate in such a way as to cause the brake controller 130 to rapidly disengage the brakes 105–108. In this embodiment, the operator substantially depresses the throttle indicating a desire for rapid acceleration. In response, the brakes are rapidly released. However, if the throttle is less than half depressed, it is presumed that the operator desires a smoother transition from a stopped vehicle to a moving vehicle and the brakes are gradually released. Step 208 releases the brakes by 20% of the maximum secure stop setting every one hundred milliseconds until the brakes are released at step 210. This process occurs so long as the operator's foot remains on the gas pedal at step 212. Assuming the secure stop mode provides a maximum engagement of the brakes, steps 202, 208, 210 and 212 gradually release the brakes of a predetermined time as the gas pedal is depressed. In the preferred embodiment, the brakes transition from fully engaged to fully disengaged over a one-half second interval. If at any time during that one-half second interval throttle is depressed to more than one half at step 202, the brakes are entirely disengaged at step 204, allowing for more rapid acceleration. FIG. 5 shows one example of a release of the brakes corresponding to an amount of desired acceleration. Predetermined values other than those shown in FIG. 5 are anticipated. Other variations are also anticipated including a more direct relationship between throttle position and release rate of the brakes wherein the rate may be non-linear. Alternately, the brakes could be released according to a predetermined process that is independent of the throttle position, including a simple rapid release of the brakes.

For the vehicle operator desiring rapid acceleration from a traffic light, steps 200–206 adds no delay over a vehicle that does not have a secure stop mode. Indeed the secure stop mode enables even more rapid starts by reducing the time from the appearance of a green light to when the vehicle is accelerated. This is because the operator's foot may rest upon the gas pedal waiting for the green light while the secure stop mode applies the brakes for the operator. This eliminates the delay encountered by requiring the operator's foot to move from the brake pedal to the gas pedal in response to the green light.

For the vehicle operator desiring a smooth transition from a vehicle stopped mode to a vehicle moving mode, the gradual release of the brakes by steps 200, 202, 208 and 210 eliminate any sudden jerking acceleration experienced by a rapid release of the brakes. Furthermore, the process recovers from an accidental light punching of the gas pedal while waiting at a traffic light without necessarily having to reapply the brakes. If during the one half second gradual brake release process, the operator's foot is removed from the gas pedal as determined at step 212, then releasing of the brake of step 208 is discontinued until the velocity of the vehicle returns to zero at step 214. Alternately, brake pressure can be gradually increased to further facilitate stopping of the vehicle. Thereafter, the process returns to step 162 of FIG. 2 to enable the secure stop mode. Thus, a short tap on the gas pedal slightly releases the brakes allowing a slight movement of the vehicle. Since the brakes are still applied, albeit with less stopping force, the vehicle slows to a stop and again returns to the secure stop mode. This allows the operator to "inch" the vehicle forward by lightly tapping on the gas pedal. In an alternate embodiment, this function may be eliminated by eliminating steps 212–216 and having step 210 proceed directly to step 202.

In an alternate embodiment, the determination an operator's desire for acceleration of step 164 could be made in response to the operator simply releasing the brake pedal. While this mode may not prevent the vehicle from moving when the operator's foot is removed from the brake, it does ensure that the vehicle's brakes are securely engaged even with a light brake pressure while the vehicle is stopped.

The invention has the advantage in that most all of the hardware of FIG. 1 exists in a modern automobile. Enhanced processes performed by the brake controller, 130, secure stop controller 150 and stop detector 155 may be implemented in software executed in either an automobile's anti-lock braking system and/or electronic system controller.

Thus, what has been provided is a vehicle that remains securely stopped when the operator intends the vehicle to be stopped. The vehicle will remain in the securely stopped mode if a fault is detected. What also been provided is a vehicle able to accelerate from a stop in a manner intended by the operator, as well as an improved mode of rapid acceleration from a stop and an improved mode of inching forward while stopped.

We claim:

1. A securely stopped motor vehicle comprising:
   a braking controller for engaging a vehicle brake for reducing vehicle speed in response to a braking input from an operator of the vehicle;
   a secure stop controller coupled to said braking controller for generating a secure stopped signal in response to the vehicle coming to a complete stop, wherein said braking controller maintains the vehicle brake engagement in response to the secure stop signal;

an acceleration controller for generating an acceleration signal for causing the vehicle to accelerate in response to an acceleration input from the operator, wherein said secure stop controller is further coupled to said acceleration controller for terminating the secure stop signal in response to the acceleration signal, thereby disengaging the vehicle brake in response to the acceleration signal; and a fault detector for detecting a fault, wherein said secure stop controller is further coupled to said fault detector and the secure stop signal is maintained upon detection of the fault, thereby maintaining activation of the vehicle brake in response to the fault wherein said braking controller further engages the vehicle brake in response to the secure stop signal and gradually disengages the vehicle brake during a disengagement time and further engages the vehicle brake in response to a termination of the acceleration signal during the disengagement time.

2. The motor vehicle according to claim 1 wherein said fault detector detects the fault in response to a vehicle collision, a vehicle malfunction or an inability of the operator to sufficiently operate the vehicle.

3. The motor vehicle according to claim 1 further wherein:

said acceleration controller generates a variable magnitude acceleration signal causing the vehicle to accelerate at a variable rate in response to a variable acceleration input from the operator and for determining a magnitude of the acceleration signal, and said braking controller automatically disengages the vehicle brake at a rate responsive to the magnitude of the acceleration signal, thereby diminishing a sudden acceleration experience in response to a reduced magnitude acceleration signal and increasing the sudden acceleration experience in response to an increased magnitude acceleration signal.

4. A method of securing a motor vehicle in a stopped condition comprising the steps of:

automatically engaging a braking system operated by an operator of the vehicle for securely stopping the vehicle in response to the vehicle being stopped and before detection of a fault;

automatically disengaging the braking system in response to an acceleration signal from the operator to enable acceleration of the vehicle, wherein the vehicle has a brake control enabling the operator to apply a varying pressure to the braking system, thereby allowing the operator to control an amount of braking force of the vehicle and wherein said step of automatically engaging the braking system automatically increases the amount of braking force of the braking system beyond a pressure applied by the operator in response to the vehicle coming to a complete stop.

5. The method according to claim 4 further comprises the step of detecting the fault, wherein said step of automatically engaging the braking system further maintains engagement of the braking system upon detection of the fault.

6. The method according to claim 5 wherein said step of detecting the fault detects the fault in response to detection of the vehicle being involved in a collision, thereby maintaining engagement of the braking system in response to the collision.

7. The method according to claim 5 wherein said step of detecting the fault detects the fault in response to a malfunction of the vehicle, thereby maintaining engagement of the braking system in response to the malfunction.

8. The method according to claim 5 wherein said step of detecting the fault detects the fault with the operator or operation of the vehicle, thereby maintaining engagement of the braking system in response to the operator being insufficiently able to operate vehicle.

9. The method according to claim 4 wherein the acceleration signal is generated in response to the operator releasing the brake control.

10. The method according to claim 4 further comprising the steps of:

generating a variable magnitude acceleration signal causing the vehicle to accelerate at a variable rate in response to a variable acceleration input from the operator and for determining a magnitude of the acceleration signal, wherein automatically disengaging the vehicle brake at a rate responsive to the magnitude of the acceleration signal, thereby diminishing a sudden acceleration experience in response to reduced magnitude acceleration signal and increasing a sudden acceleration experience in response to an increased magnitude acceleration signal.

11. A motor vehicle comprising:

a braking controller for engaging a vehicle brake system for reducing vehicle speed in response to a braking input from an operator of motor vehicle and for enabling the operator to apply a varying pressure to the vehicle brake system, thereby allowing the operator to control an amount of braking of the vehicle; and a secure stop controller coupled to said braking controller for generating a secure stop signal in response the vehicle coming to a complete stop, wherein said braking controller further automatically engages the vehicle brake system by increasing the amount of braking force of the vehicle brake system beyond a pressure applied by the operator while the vehicle is stopped in response to the secure stop signal and prior to detection of a fault.

12. The motor vehicle according to claim 11 further comprising a fault detector wherein the secure stop signal is maintained upon detection of the fault, thereby maintaining activation of the vehicle brake in response to the fault.

13. The motor vehicle according to claim 12 wherein said fault detector detects the fault in response to detection of the vehicle being involved in a collision, thereby maintaining engagement of the braking system in response to the collision.

14. The motor vehicle according to claim 12 wherein said fault detector detects the fault in response to a malfunction of the vehicle, thereby maintaining activation of the vehicle brake in response to the malfunction.

15. The motor vehicle according to claim 12 wherein said fault detector detects the fault with the operator or operation of the vehicle, thereby maintaining activation of the vehicle brake in response to the operator being insufficiently able to operate vehicle or if operation of the vehicle would likely result in a collision.

16. The motor vehicle according to claim 15 wherein said fault detector determines if the operator of the vehicle is excessively sleepy.

17. The motor vehicle according to claim 11 further comprising:
an acceleration controller for generating an acceleration signal causing the vehicle to accelerate in response to an acceleration input from the operator, wherein
said secure stop controller is further coupled to said acceleration controller for terminating the secure stop signal in response to the acceleration signal, thereby disengaging the vehicle brake in response to the acceleration signal.

18. The motor vehicle according to claim 17 wherein the acceleration signal is generated in response to the operator releasing the brake control.

19. The motor vehicle according to claim 11 further comprising:
an acceleration controller for generating a variable magnitude acceleration signal causing the vehicle to accelerate at a variable rate in response to a variable acceleration input from the operator and for determining a magnitude of the acceleration signal, wherein
said braking controller automatically disengages the vehicle brake at a rate responsive to the magnitude of the acceleration signal, thereby diminishing a sudden acceleration experience in response to reduced magnitude acceleration signal and increasing a sudden acceleration experience in response to an increased magnitude acceleration signal.

20. The motor vehicle according to claim 11 further comprising
an acceleration controller for generating an acceleration signal causing the vehicle to accelerate in response to an acceleration input from the operator, wherein
said braking controller gradually disengages the vehicle brake during a disengagement time and further engages the vehicle brake in response to a termination of the acceleration signal during the disengagement time.

* * * * *